United States Patent [19]

Latge

[11] Patent Number: 5,149,493
[45] Date of Patent: Sep. 22, 1992

[54] INSTALLATION TO REGENERATE COLD TRAPS LOADED WITH THE HYDRIDE AND OXIDE OF A LIQUID METAL

[75] Inventor: Christian Latge, Aix en Provence, France

[73] Assignee: Commissariat a l'Energie Atomique, Paris, France

[21] Appl. No.: 510,972

[22] Filed: Apr. 19, 1990

[30] Foreign Application Priority Data

Apr. 20, 1989 [FR] France ............................. 89 05261

[51] Int. Cl.$^5$ ............................................ G21C 19/42
[52] U.S. Cl. ..................................... 376/312; 62/55.5; 55/DIG. 15
[58] Field of Search ........................ 376/312; 62/55.5; 55/DIG. 15

[56] References Cited

U.S. PATENT DOCUMENTS

| | | | |
|---|---|---|---|
| 2,879,157 | 3/1959 | Batutis et al. | 75/66 |
| 3,941,586 | 3/1976 | McKee, Jr. | 75/66 |
| 4,010,068 | 3/1977 | Cooper | 176/37 |
| 4,290,822 | 9/1981 | Maupre et al. | 134/19 |
| 4,581,200 | 4/1986 | Himeno | 376/310 |
| 4,587,083 | 5/1986 | Colburn | 376/313 |

FOREIGN PATENT DOCUMENTS

| | | |
|---|---|---|
| 0012074 | 6/1980 | European Pat. Off. |
| 54-37012 | 3/1979 | Japan. |
| 60-138027 | 7/1985 | Japan. |
| 0473221 | 6/1975 | U.S.S.R. ............... 376/312 |
| 0601763 | 4/1978 | U.S.S.R. ............... 376/312 |

OTHER PUBLICATIONS

Takahashi, Katsuro, et al. "Regeneration of a Cold Trap", Nuclear Technology, Sep. 1981, pp. 278-285.

*Primary Examiner*—Brooks H. Hunt
*Assistant Examiner*—Chrisman D. Carroll

[57] ABSTRACT

Installation and method to regenerate cold traps loaded with the hydride and oxide of a metal, such as sodium, in its liquid state. A forced circulation of the orginal liquid metal of a tank (11) is created at a temperature sufficient to dissolve the solid deposits. The hydrogen and tritium ions are filtered and end up at a storage tank (42) where they are fixed, whereas the oxygen ions recombine so as to form a new oxide deposit in another trap (23) cooled to a temperature enabling only the oxide to be deposited. An application is for fast neutron nuclear reactors and fusion reactors.

3 Claims, 3 Drawing Sheets

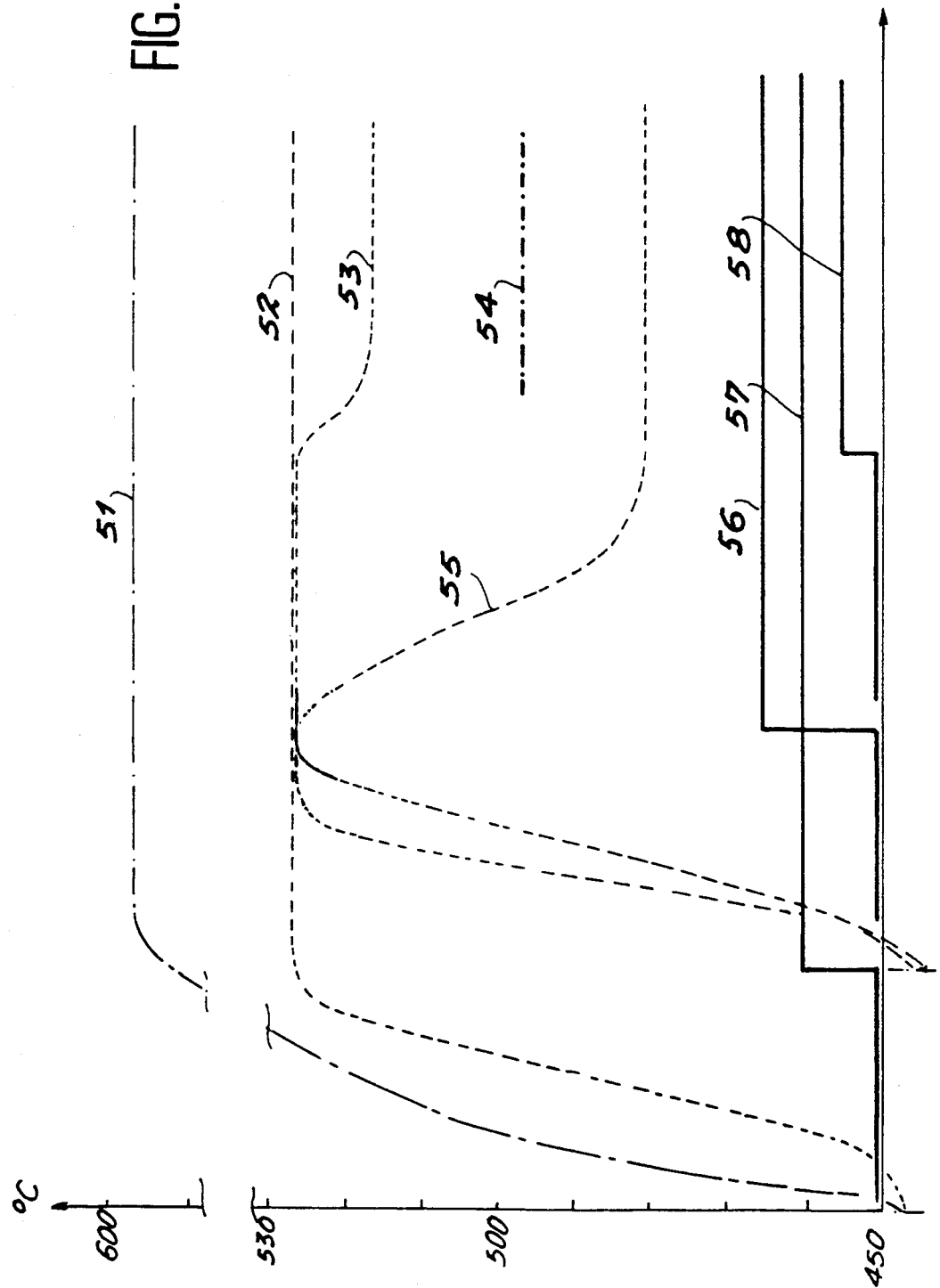

INSTALLATION TO REGENERATE COLD TRAPS LOADED WITH THE HYDRIDE AND OXIDE OF A LIQUID METAL

FIELD OF THE INVENTION

The invention concerns an installation and method to regenerate cold traps loaded with the hydride (possibly loaded with the trituride and oxide) of a liquid metal, such as sodium, used in fast neutron reactors, especially for the secondary circuits.

BACKGROUND OF THE INVENTION

It is well-known that the liquid is polluted during the functioning of a power plant by the hydrogen which diffuses through the walls of the stream generators, as well as by the oxygen and hydrogen which are able, in particular, to originate from sodium/water reactions resulting from a leak in the steam generator. It is essential to remove these impurities in the sodium so as to limit corrosion of the structures by oxygen, the embrittlement of steel caused by hydrogen, but also to facilitate detection of the sodium/water reaction by maintaining a low hydrogen concentration, and so as to limit the risks of sealing with the hydride and oxide crystals which might form in the cold traps. To avoid this happening, a large number of models of cold traps have been considered, these traps generally comprising a tank where the liquid sodium is cooled below the crystallization temperature of the hydride and the oxide. These crystals become secured to the retention structures inside the trap, such structures being for example filters lined with metal wool.

The progressive fouling of the traps may mean that they need to be periodically regenerated by purging from them any solid impurities. The known method, which exists in several variants, has as one of its main characteristics a preliminary dumping of the liquid sodium which fills the cold trap and a heating of the emptied seat so as to thermally decompose the impurities. At 420° C., the sodium hydride contained in the trap is decomposed according to the reaction (1):

$$NaH \longrightarrow Na + \tfrac{1}{2}H_2 \qquad (1)$$

The sodium freed by the reaction is in a liquid state and the hydrogen reacts with the sodium oxide according to the reaction (2):

$$Na_2O + \tfrac{1}{2}H_2 \longrightarrow Na + NaOH \qquad (2)$$

Caustic soda is thus formed which is then able to solidify (below 320° C.) when heating ceases.

This method has several drawbacks. First of all, the reaction (2) is slow, it requires a prolonged treatment and, in practice, is impossible to carry out with the trap mounted on the reactor; therefore it would be proper to change the cold trap, if possible at the time of a programmed stoppage of the reactor, and to treat much later the trap full of impurities outside the reactor. Other difficulties arise from the presence of tritium hydrogen which is possible to reject into the atmosphere by only observing very strict rejecting norms, namely at extremely low flowrates; moreover, one part combines so as to form the soda whereas it may be more advantageous to isolate it so as to collect it. The evolution of gaseous hydrogen provokes an excess pressure (which moreover often needs to be maintained by a current of hydrogen in order to complete the chemical decomposition of the sodium oxide), which thus generates the need to continously control the pressure. With regard to the high temperature, the presence of soda results in a rapid generalized corrosion of the stainless steel wall of the trap and its lining. The gaseous hydrogen may also embrittle the steel. Finally, all the cold traps do not lend themselves to an easy emptying of the liquid sodium and the soda.

It is possible to avoid rejecting the tritium into the atmosphere by securing it to certain solid bodies. Unfortunately, the other drawbacks still remain.

However, the invention is seeking to regenerate the effectively and rapidly cold traps by totally eliminating impurities without having to unload the cold trap from the reactor. One essential object of the invention consists of separating the hydrogenated and oxygenic compounds so as to be able if need be to easily collect the tritium. The formation of soda is avoided, the corrolary of this being the absence of corrosion and which constitutes an essential difference from the European patent 0 012 074 of the same applicant, this patent describing a method to wash the trap with soda. This method facilitates dissolving the impurities in the soda, but the problems of corrosion have led this method to be abandoned.

SUMMARY OF THE INVENTION

The characteristic installation of the invention includes a circuit filled with liquid metal on which at least one trap to be regenerated is disposed, the circuit being provided with means to establish a circulation of the liquid metal in the circuit and through the trap, means to adjust the temperature of the liquid metal to values sufficient to dissolve the oxide and hydride, a device to draw off the dissolved tritium and hydrogen and a dump equipped with a device for retention of the oxygen.

The device to draw off the hydrogen and tritium is envisaged in the form of a permeation membrane with one face communicating with the metal liquid circuit and the other with the partial vacuum pumping circuit, which may be provided with a solid fixing the hydrogen. The transfer of the hydrogen through the membrane is ensured by a partial pressure difference controlled by the operating conditions of the installation.

The device for retention of the oxygen is preferably constituted by a cold trap where the oxide is crystallized again.

The constitutive method of the invention consists of making the liquid metal circulate through the trap at a temperature sufficient so as to progressively dissolve the hydride and the oxide, to draw off the dissolved hydrogen so as to maintain the dissolved hydrogen concentration below saturation, and to have the liquid metal pass into another cold trap cooled to a temperature lower than the oxide crystallization temperature and greater than the hydride crystallization temperature.

The liquid metal may advantageously be reheated before the hydrogen is drawn off so as to improve permeation through the membrane and then be cooled to a temperature greater than the hydride crystallization temperature.

BRIEF DESCRIPTION OF THE DRAWINGS

There now follows a description of the following annexed figures, given by way of illustration and being in no way restrictive:

FIG. 3 is a graph explaining the method.

DETAILED DESCRIPTION OF THE PREFERRED EMBODIMENTS

Figure 1:
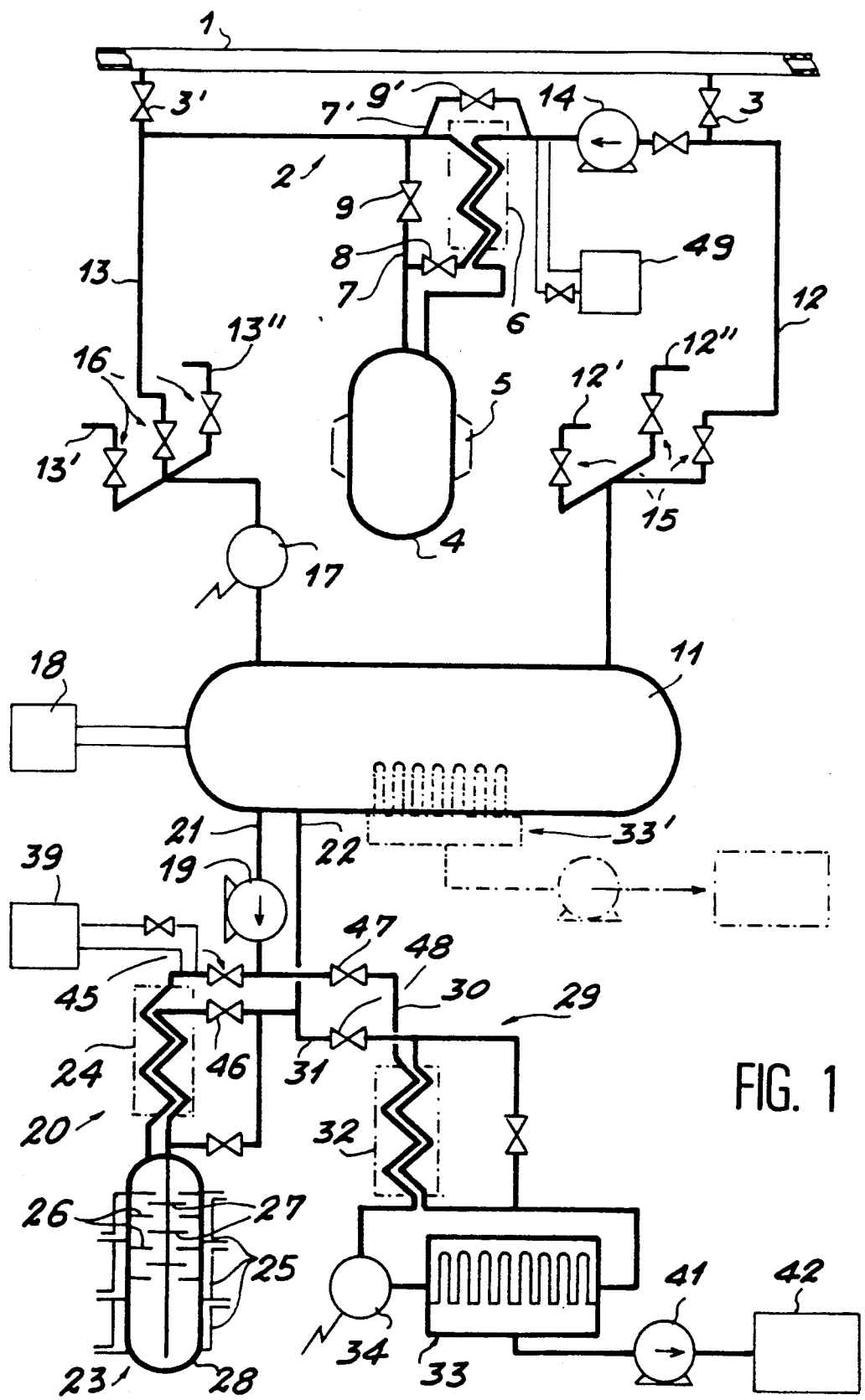
FIG. 1 is a general diagram of an embodiment of the invention.

FIG. 1 shows a pipe 1 for circulating the liquid sodium in a secondary loop of a fast neutron nuclear reactor. A cold trap dump 2 is established on the pipe 1 which may be separated by two valves 3, 3' at its extremities.

A cold trap 4 to be regenerated is installed on the dump 2. It is mainly composed of a tank lined inside with structures for retention of solid impurities and is surrounded by a jacket 5 passed through by a cooling fluid. An extremely high number of cold traps exist available to be used in the invention; a more detailed description shall not be given here, but if appropriate it is possible to refer to the French patent 2 624 032.

The dump 2 forms near the cold trap 4 a first thermal exchanger device 6 by means of which the sodium arriving at the cold trap 4 is cooled by passing close to the sodium leaving this cold trap. A dump pipe 7 may be provided so as to interrupt the thermal exchange by, in collaboration with two valves 8 and 9, preventing the liquid sodium having left the cold trap passing through the first exchanger 6. When the cold trap is used to purify the sodium, this exchanger makes it possible to control the average functioning temperature of the cold trap.

The installation also includes a liquid sodium tank 11 connected to the dump 2 by means of an induction pipe 12 and a driving back or repression pipe 13 which forms with these a liquid sodium circuit whose circulation may be forced through the cold trap 4 by means of a first pump 14. Similar induction and repression pipes 12', 12'', 13' and 13'' parallel to the preceding ones may also be connected to the tank 11 and dumps on other reactor secondary loops (not shown), even if the regeneration installation may be common to the power plant and be successively used for several cold traps. Valves 15 and 16 established on each of the induction and repression pipes 12, 13, etc., ensure correct switching.

The other essential elements on the liquid sodium circuit consist of a first heater 17 situated on the section of the repression pipe 13 nearest the tank 11 and designed to bring the calories required to keep the storage to the desired temperature, a sealing indicator 49 established on the dump 2 and which is used to control the concentration of the impurities when the cold trap is used to purify the sodium of the secondary loop, and a first device 18 to measure the oxygen and hydrogen content in the tank 11.

A bypass 7' equipped with a valve 9' makes it possible to short-circuit the cold trap to be regenerated 4 during the stage for heating the sodium of the storage tank 11.

A dump circuit 20 is also connected to the tank 11. It includes an outlet pipe 21 on which a second pump 19 is installed, a return pipe 22 and a cold storage trap 23 at which the two pipes 21 and 22 end after having formed a second thermal exchanger 24 at its inlet. The cold storage trap 23 is not regenerated and is used to exclusively keep the oxygen in the form of an oxide. It is thus able to have a large capacity and has been selected so as to conform to the indications of the French patent 2 603 497 to be referred to subsequently. But it is clear that any type of cold trap may be used in this respect. To sum up the foregoing, the cold storage trap 23 indicated above is cooled by a plurality of cooling modules 25 disposed in series along its cylindrical casing 28 and the inside of the casing contains a series of parallel and alternate plates 26 and 27 which delimit a baffle hollow space: the plates 26 are ring-shaped and delimit a central hollow space, whereas the plates 27 are disks which delimit a ring-shaped interval along with the casing 28. Each of the plates 26 and 27 is constituted by an openworked plate lined with metallic wool: when the storage trap 23 is new, the sodium passes roughly in a straight line through the plates 26 and 27 and then when the latter are fouled, the sodium deforms them without reducing the effectiveness of retention of the crystallized impurities by virtue of the elongation of the path. The terracing or stepping of several cooling modules 25 makes it possible to vary the locations where the deposit of impurities predominates and thus to properly distribute the fouling. The inlet pipe 21 opens at the top of the cold storage trap 23 and the outlet pipe 22 at the bottom of the latter after having traversed it axially.

A sub-dump 29 is connected to the dump 20: the inlet pipe 21 bifurcates and forms an inlet branch 30, whereas the outlet pipe 22 also bifurcates and forms an outlet branch 31. The two branches 30 and 31 draw close together so as to form a third thermal exchanger 32 and are joined at the extremities of a permeation system known as a "permeator" 33. A heater 34 is disposed on the inlet branch 30 between the third thermal exchanger 32 and the permeator 33.

Valves 45 to 48 are established on these various pipes so as to favor, limit or interrupt the outflows of the sodium by the cold storage trap 23 and the permeator 33. A second device 39 to measure the content of oxygen and hydrogen is then installed on the inlet pipe 21.

Figure 2:
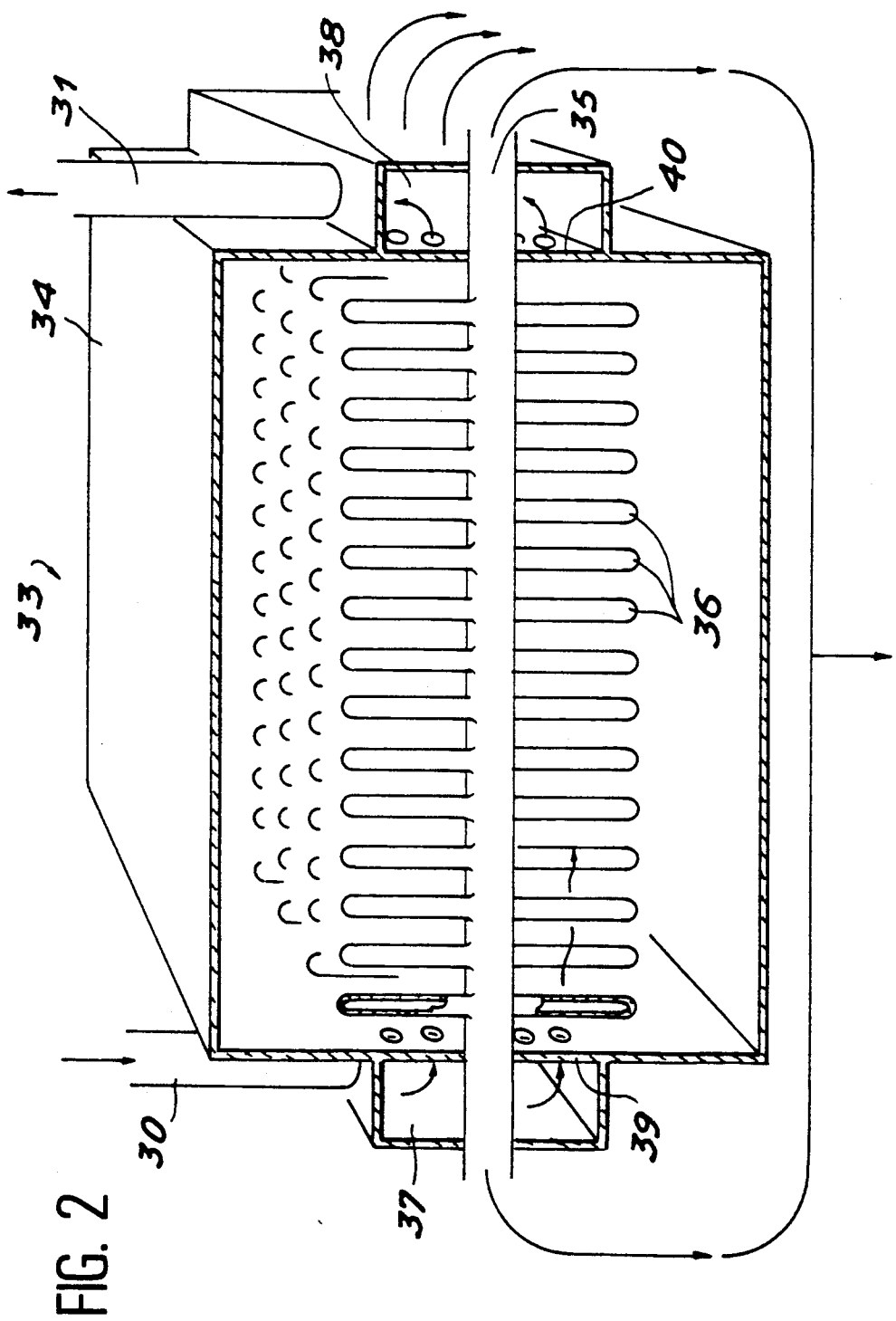
FIG. 2 shows in detail an example of the device for drawing off the hydrogen.

The permeator 33, shown in detail on FIG. 2, is constituted by a casing 34 traversed by a looped pipe 35 covered with lengthening pieces 36 which extend inside the casing 34 and constitute a permeation membrane. They are made of a finger-shaped material, such as nickel, with a high permeation rate of several hundreds or thousands and these finger shaped pieces are several hundred millimeters thick. The branches 30 and 31 end at the casing 34 by means of collectors 37 and 38 separated from the lengthening pieces 36 by perforated plates 39 and 40 which distribute the flow and render it approximately perpendicular to the lengthening pieces 36.

The looped pipe 35 ends at a vacuum pump 41 and storage tank 42 lined with a material to retain the hydrogen, said material being, for example, in the form of chips of a lanthanum, nickel and manganese alloy.

The internal face of the lengthening pieces 36 opening onto the looped pipe 35 is kept in a partial depression with respect to the external face bathed by the sodium so as to facilitate transfer of the hydrogen contained in the sodium to the pipe under vacuum through the membrane.

FIG. 1 delineates a slightly different disposition where the sub-dump 29 would be omitted and the permeator—then referenced 33'—would be in the tank 11, which would result in a simplified disposition but preventing the use of the second heater 34 which significantly reinforces the effectiveness of regeneration.

So as to carry out regeneration, as soon as the valves 3 and 3' have been closed to separate the dump 2 from the loop 1, the first pump 14 is activated so as to establish a forced circulation of the liquid sodium through the tank 11 and the cold trap 4 to be regenerated. The first heater 17 is also activated, whereas the functioning of the cooling system 5 of the cold trap is interrupted so that the sodium circulated by the first pump 14 is heated to a relatively high temperature, such as 520° C.

It is important to mention that the decomposition reactions (1) and (2) listed earlier are not able to occur owing to the presence of the sodium. In place of these, dissolutions of hydride and oxide deposits progressively occur according to the ionic dissociation reactions (3) and (4):

$$NaH^- \rightarrow Na^+ + H \quad (3)$$

$$Na_2O \rightarrow 2Na^+ + O \quad (4)$$

When it is established by means of the first measuring device 18 that the sodium is saturated with oxygen and hydrogen, one part is in fact passed through the permeator 33 after having opened the valves 47 and 48 and activated the second pump 19 and the heater 34. This heater sets up an overheating temperature, such as 600° C., in the permeator 33.

The filtration of the hydrogen ions including tritium through the lengthening pieces 36 is facilitated and these ions are pumped up to the storage tank 42 where they are adsorbed by the alloy. A subsequent thermal treatment of this alloy so as to extract the hydrogen and tritium may easily be effected.

The largest oxygen ions do not traverse the permeation membrane and therefore remain in the liquid sodium.

When the hydrogen concentration has again stabilized, the valves 45 and 46 are opened. Sodium also passes through the cold storage trap 23 and which is cooled by the modules 25 so that the oxide is deposited there according to a reaction being opposite the reaction (4).

It is also possible to set up a temperature at the cold point of the cold storage trap 23, this temperature being less than the oxide crystallization temperature but greater than the hydride crystallization temperature. Thus, it is possible to provide a temperature of 495° C. if the two crystallization temperatures mentioned are respectively 515° C. and 480° C. As a result, the hydride and in particular the tritium do not remain in the cold storage trap 23 and a segregation of the two main impurities is effected. If desired, it is a simple matter to clean the cold storage trap 23 after a regeneration process: it merely suffices to disassemble it from the installation and to wash it with soda without taking any particular precautions, as the sodium oxide is not radioactive.

FIG. 3 explains the method. The abscissae represent the time and the ordinates represent the temperatures or flows (the scale of the latter is not specified). The curves 51 to 58 respectively represent the temperature in the permeator 33, the temperature in the tank 11 and in the trap 4 to be regenerated, the oxide crystallization temperature, the temperature in the cold storage trap 23, the hydride crystallization temperature, the flow passing through the permeator 33, the flow passing through the trap 4 to be regenerated and the flow passing through the cold storage trap 23.

The transitory stages of the method are clearly distinguished and in particular also the drop of the concentration of the hydride as soon as the permeator 33 is used, this being expressed by a difference between the crystallization temperatures of the hydride and the oxide and thus ensures that no hydride is collected in the cold storage trap 23.

The process is continued until the cold trap 4 has been completely regenerated. When the hydrogen or oxygen has been completely eliminated, it is obviously possible to close the circuit ending at the corresponding retention device by means of the valves 45, 46 or 47, 48. For certain types of reactors, especially those excluding a water/sodium reaction, pollutions occuring by hydrides is preponderant.

The overall time of all the operations naturally depends mainly on the quantity of impurities to be eliminated and contained in the trap 4, the size of the permeator 33 and all the selected operational conditions. By way of example, for the Super Phenix 1 reactor, the period of the operation may last for one week for a cold trap having purified the sodium for eight years of functioning.

This regeneration method may be advantageously used to recover the tritium produced in a fusion reactor tritigen blanket, especially when the tritium is extracted from a tritigen blanket constituted by the lithium/lead eutectic and then introduced into a liquid metal circuit through a permeation membrane and finally crystallized in a solid form in a cold trap: the extraction of the sodium tritide is carried out in accordance with the invention when the cold trap is full.

There is no need to disassemble the cold trap 4, which would have been required for some of these traps before draining, and the installation described is constructed at the same time as the power plant and does not require any particular connection in order to have it function.

What is claimed is:

1. An installation for regeneration of cold traps loaded with hydride and oxide of a liquid metal, wherein said installation includes a regeneration circuit filled with liquid metal on which is disposed at least one trap to be regenerated, said regeneration circuit being provided with means to establish a circulation of the liquid metal in the regeneration circuit and through the trap, means to adjust the temperature of the liquid metal to values sufficient to dissolve the oxide and the hydride which decompose to give off hydrogen, tritium and oxygen, and a device to draw off the dissolved hydrogen and tritium and a first dump equipped with an oxygen retention device, said device to draw off the dissolved hydrogen and tritium comprising a membrane through which hydrogen and tritium permeate, said membrane having one face communicating with the liquid metal regeneration circuit and another face communicating with a partial vacuum pumping circuit with respect to the liquid metal regeneration circuit, and a tank disposed on the partial vacuum pumping circuit which is lined with a solid for fixing the hydrogen and the tritium.

2. Regeneration installation according to claim 1, wherein the liquid metal regeneration circuit includes a second dump on which the device is installed so as to draw off the hydrogen and the tritium, and an additional heating device upstream of said device.

3. Regeneration installation according to claim 1, wherein the oxygen retention device is another cold trap where the existing temperature is less than the oxide crystallization temperature and greater than the hydride crystallization temperature.

* * * * *